June 26, 1962  H. L. GIERAT  3,040,465

FISHING PLUG WITH WATER PASSAGES

Filed Oct. 5, 1959

INVENTOR.
Henry L. Gierat
BY
John J. Kowalik
Atty.

United States Patent Office 3,040,465
Patented June 26, 1962

3,040,465
FISHING PLUG WITH WATER PASSAGES
Henry L. Gierat, 6630 Belmont Ave., Chicago 34, Ill.
Filed Oct. 5, 1959, Ser. No. 844,353
8 Claims. (Cl. 43—42.06)

This invention relates to fishing plugs and more specifically to a lure of novel form designed to create a disturbance in the water such as will attract the attention of fish and urge them to take the plug.

A general object of the invention is to provide a novel plug in which the water through which the plug is drawn is caused to create minor turbulence in the manner of a frisking fish to act as a bait.

A more specific object of the invention is to devise a lure in the general form of a small fish including a hollow generally fusiform body providing a passage for water therethrough from an inlet at the forward end of the body through openings in the sides and open rear end of the body, the sides of the body being provided with vanes which serve to channel the water from within the body to issue through the sides with a small turbulent effect.

A still further object of the invention is to devise the vanes so that they tend to flutter as the water impinges thereagainst pursuant to forward movement of the body so as to create an erratic movement action in the plug.

A still further object is to devise and arrange the vanes disposed in various different angles and different effective areas to simulate a panicky flight of the bait.

These and other objects and advantages inherent in and encompassed by the invention will become more readily apparent from the following specification and drawings wherein.

Figure 1:
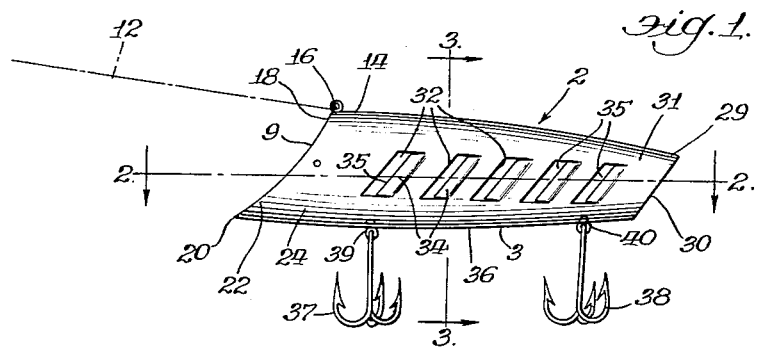
FIGURE 1 is a side elevational view of one form of lure made in accordance with the invention.
Figure 2:
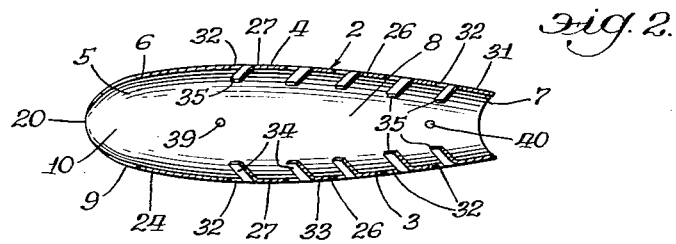
FIGURE 2 is a longitudinal sectional view taken essentially on line 2—2 of FIGURE 1.
Figure 3:
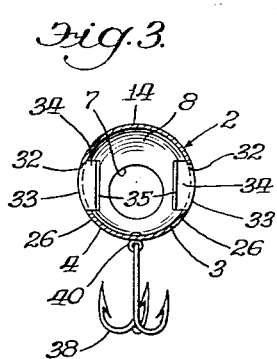
FIGURE 3 is a cross-sectional view taken substantially on line 3—3 of FIGURE 1.

*Description of the Embodiment of FIGURES 1–3*

Describing the invention in detail and having particular reference to FIGURES 1–3 of the drawings, there is shown a lure or plug generally designated 2 comprising a body 3 substantially fusiform in plan and tapering from front to rear in side elevation.

The body 3 is a hollow structure having a thin wall 4 made preferably of plastic which provides a large mouth or inlet port 5 at its forward end 6 and a small exhaust or rear opening 7 at opposite ends of the central passageway 8.

The forward end 6 of the body has diagonal leading or forward edge 9 which slopes downwardly and forwardly and forms a scoop structure 10 about the opening 5. The scoop 10 is adapted to dive the lure into the water and direct the water into the passage 8 as the lure is being pulled by the line 12 which is secured to the upper side 14 of the body 3 by the eye 16 which is located adjacent to the upper end 18 of the forward edge 9 of the body 3. Thus the front opening 5 presents a large area to the admittance of a large volume of water and good penetration is obtained by the sharp leading point 20 at the lower forward end 22 of the forward portion 24 of the body 3.

It will be seen from FIGURE 2 that the lateral sides 26, 26 of the body 3 bow outwardly at 27, 27 and then converge rearwardly.

It will be seen that the top side 14 of the body 3 extends over the rear opening 7 and forms a tail appendage 29 and the rear edge 30 slopes downwardly and forwardly. The overhang of the tail-like structure or appendage 29 tends to counteract the tendency of the scoop to dive the lure by modifying the action of the rear portion 31 of the lure.

Each side 26 of the body is provided with a series of slits 32 which communicates the interior 8 with the exterior 33 of the lure. The slits or openings 32 permit the escape of the water from the interior 8 to the exterior 33, the water impinging on the forward sides 34 of inwardly directed vanes 35 which are angled upwardly and rearwardly. These vanes 35 are formed from the sides of the body and are preferably resilient and thin enough to vibrate as the lure is pulled through the water to create a rippling effect in the water exuding from the sides.

The bottom side 36 of the body is provided with two sets of hooks 37, 38 suspended from the eyes 39 and 40 respectively.

Figure 4:
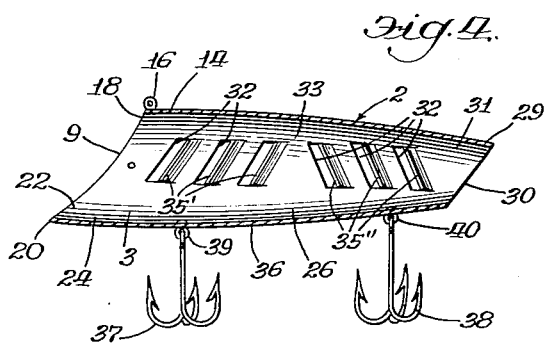
FIGURE 4 is a side elevational view of another embodiment of the invention.

*Description of the Embodiment of FIGURE 4*

The embodiment of FIGURE 4, the general structure of the plug is similar to that of FIGURES 1–3 and therefore like parts are identified with corresponding numerals. In the present modification the forward set of vanes 35' are angled similar to those of FIGURES 1–3 upwardly and rearwardly which tends to urge the lure downwardly, whereas the rear set of vanes 35 which slope rearwardly and downwardly tend to urge the rear end portion of the lure upwardly. The constant struggle in the action of these two sets of vanes in addition to burbling the water tend to wiggle lure in a fish-attracting fashion.

Figure 5:
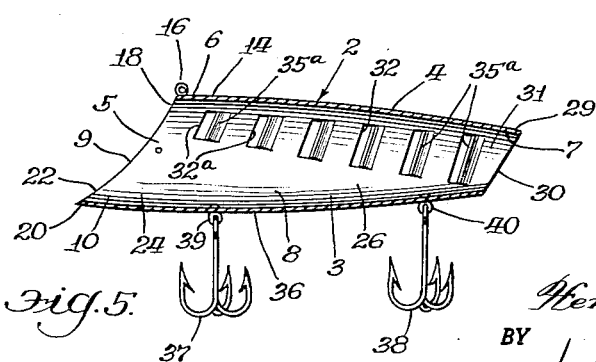
FIGURE 5 is a longitudinal vertical sectional view of still another embodiment of the invention.

*Description of the Embodiment of FIGURE 5*

The general configuration of this embodiment is similar to the preceding designs and corresponding parts are identified with corresponding numerals. In this variation, the side openings 32a are graduated from front to rear and the vanes which angle upwardly and rearwardly noted 35a are progressively larger. The effect of the rear vanes 35a in the constricted rear end portion 31 of the lure is to direct a larger volume of water through the sides. The uneven flow disturbs the movement of the lure through the water and erratically moves it about to attract fish.

It will be understood that the foregoing embodiments are shown by way of example in depicting several forms of the invention by way of disclosure and not limitation, and that various other forms of the invention will become readily apparent within the scope of the appended claims.

What is claimed is:

1. A fishing lure having a longitudinal body including a passage therethrough with an inlet for admitting water into the passage pursuant to said lure being drawn through the water, said body having a transverse opening, and a vane formed from the body and directed into the passage and disposed in water-directing relation to the opening and said vane being sufficiently thin that it vibrates to ripple the water.

2. In a fish plug, the combination of a hollow tubular body having a forward open inlet end and a rear open discharge end, said body having a scoop-like forward projection and a tail-like appendage beneath and over said front and rear openings respectively, and a series of longitudinally spaced inwardly projecting vanes on the body, said body having a series of openings disposed in alternating relationship to the vanes and said vanes being formed of flexible and resilient material whereby they are capable of fluttering.

3. In a fish plug, the combination of a hollow tubular body having a forward open inlet end and a rear open discharge end, said body having a scoop-like forward projection and a tail-like appendage beneath and over said front and rear openings respectively, and a series of longitudinally spaced inwardly projecting vanes on the body, said body having a series of openings disposed in alternating relationship to the vanes and said openings and vanes being progressively larger in area from front to rear of the body.

4. In a fish plug, the combination of a hollow tubular body having a forward open inlet end and a rear open discharge end, said body having a scoop-like forward projection and a tail-like appendage beneath and over said front and rear openings respectively, and a series of longitudinally spaced inwardly projecting vanes on the body, said body having a series of openings disposed in alternating relationship to the vanes and said vanes and openings disposed at opposite sides of the body and the forwardly positioned vanes angled reversely to the rearwardly positioned vanes thereof.

5. A fish lure comprising a tubular body having a central passage with forward inlet opening and a rear outlet opening, said body having lateral sides with a plurality of apertures therethrough spaced longitudinally of the body and vanes on the body projecting therefrom and arranged to direct water through the openings and said vanes extending from the sides of the body into the passage and the apertures and vanes being progressively larger from one end of the body to the other.

6. A fish lure comprising a bilaterally symmetrical hollow body having a front end and a rear end, said body having a passageway therethrough with an inlet at the front end of the body, and an outlet at the rear end of the body, said inlet defined by a leading edge on the front end of the body extending diagonally forwardly and providing a forward front end scoop structure, said body having lateral sides with inwardly directed vanes, the vanes on one side converging forwardly of the body with the vanes on the opposite side, and said sides having a water exit opening ahead of each vane and each vane being resilient and flexible.

7. A fish lure comprising a hollow body having front end and a rear end, said body having a passageway therethrough with an inlet at the front end of the body, and an outlet at the rear end of the body, said inlet defined by a leading edge on the front end of the body extending diagonally forwardly and providing a forward front end scoop structure, said body having lateral sides with inwardly directed vanes, the vanes on one side converging forwardly of the body with the vanes on the opposite side, and said sides having a water exit opening ahead of each vane and said vanes and openings being progressively larger from front to rear of the body.

8. A fish lure comprising a hollow body having front end and a rear end, said body having a passageway therethrough with an inlet at the front end of the body, and an outlet at the rear end of the body, said inlet defined by a leading edge on the front end of the body extending diagonally forwardly and providing a forward front end scoop structure, said body having lateral sides with inwardly directed vanes, the vanes on one side converging forwardly of the body with the vanes on the opposite side, and said sides having a water exit opening ahead of each vane and said vanes being arranged in front and rear groups at each side of the body, and said front group sloping downwardly forwardly and the rear group inclined downwardly rearwardly.

References Cited in the file of this patent
UNITED STATES PATENTS

| | | |
|---|---|---|
| 1,078,886 | Welles | Nov. 18, 1913 |
| 1,946,641 | Sisco | Feb. 13, 1934 |
| 2,317,781 | Lehto | Apr. 27, 1943 |
| 2,549,077 | Garth | Apr. 17, 1951 |
| 2,589,970 | Shahan | Mar. 18, 1952 |
| 2,632,276 | Hale | Mar. 24, 1953 |
| 2,748,522 | Mulcahey | June 5, 1956 |
| 2,817,180 | Thomas | Dec. 24, 1957 |
| 2,952,935 | Jordan | Sept. 20, 1960 |

FOREIGN PATENTS

| | | |
|---|---|---|
| 9,829 | Great Britain | of 1903 |
| 794,152 | Great Britain | Apr. 30, 1958 |
| 262,197 | Switzerland | Sept. 16, 1949 |